(12) United States Patent
Gunther et al.

(10) Patent No.: US 12,381,640 B1
(45) Date of Patent: Aug. 5, 2025

(54) APPARATUS AND METHOD FOR TESTING BLUETOOTH LOW ENERGY (BLE) INLAYS EMPLOYING WAVEGUIDES

(71) Applicant: George Schmitt & Co., Inc, Guilford, CT (US)

(72) Inventors: William G. Gunther, Essex, CT (US); James W. Hough, Guilford, CT (US)

(73) Assignee: George Schmitt & Co., Inc, Guilford, CT (US)

( * ) Notice: Subject to any disclaimer, the term of this patent is extended or adjusted under 35 U.S.C. 154(b) by 0 days.

(21) Appl. No.: 19/098,480

(22) Filed: Apr. 2, 2025

Related U.S. Application Data

(60) Provisional application No. 63/757,509, filed on Feb. 12, 2025, provisional application No. 63/748,201, filed on Jan. 22, 2025.

(51) Int. Cl.
*H04B 17/17* (2015.01)

(52) U.S. Cl.
CPC .................. *H04B 17/17* (2015.01)

(58) Field of Classification Search
CPC ...................................... H04B 17/17
See application file for complete search history.

(56) References Cited

U.S. PATENT DOCUMENTS

| | | | | |
|---|---|---|---|---|
| 8,674,811 | B2 * | 3/2014 | Huang | H04Q 9/00 340/10.3 |
| 8,896,425 | B1 * | 11/2014 | Martin | G06K 7/10435 340/10.51 |
| 2006/0145710 | A1 * | 7/2006 | Puleston | G06K 7/0008 702/182 |
| 2010/0156640 | A1 * | 6/2010 | Forster | G06K 7/1097 340/572.1 |
| 2012/0249303 | A1 * | 10/2012 | Hadley | H02M 7/217 235/492 |
| 2022/0148726 | A1 * | 5/2022 | Costantino | G16H 40/67 |
| 2022/0230125 | A1 * | 7/2022 | Vedantam | G06Q 10/063114 |
| 2022/0318532 | A1 * | 10/2022 | Roth | G06K 7/10445 |
| 2024/0013014 | A1 * | 1/2024 | Bleckmann | G06K 7/10425 |

* cited by examiner

*Primary Examiner* — Dominic E Rego
(74) *Attorney, Agent, or Firm* — Forge IP, PLLC

(57) ABSTRACT

A system for testing inlays employing a Bluetooth Low Energy (BLE) protocol that are carried on a web, and for removing from the web inlays that are not functioning within defined parameters, includes an energizing device that energizes the inlays, a plurality of singulation readers disposed downstream of the energizing device that simultaneously interrogate a plurality of pre-energized inlays during a read operation, each singulation reader interrogating a single inlay during the read operation and determining whether or not each interrogated inlay is functioning within the defined parameters, and an automatic reject apparatus disposed downstream of the singulation readers that removes from the web any malfunctioning inlay, based at least in part on a position of the singulation reader interrogating the malfunctioning inlay with respect to a reject gate of the automatic reject apparatus.

18 Claims, 1 Drawing Sheet

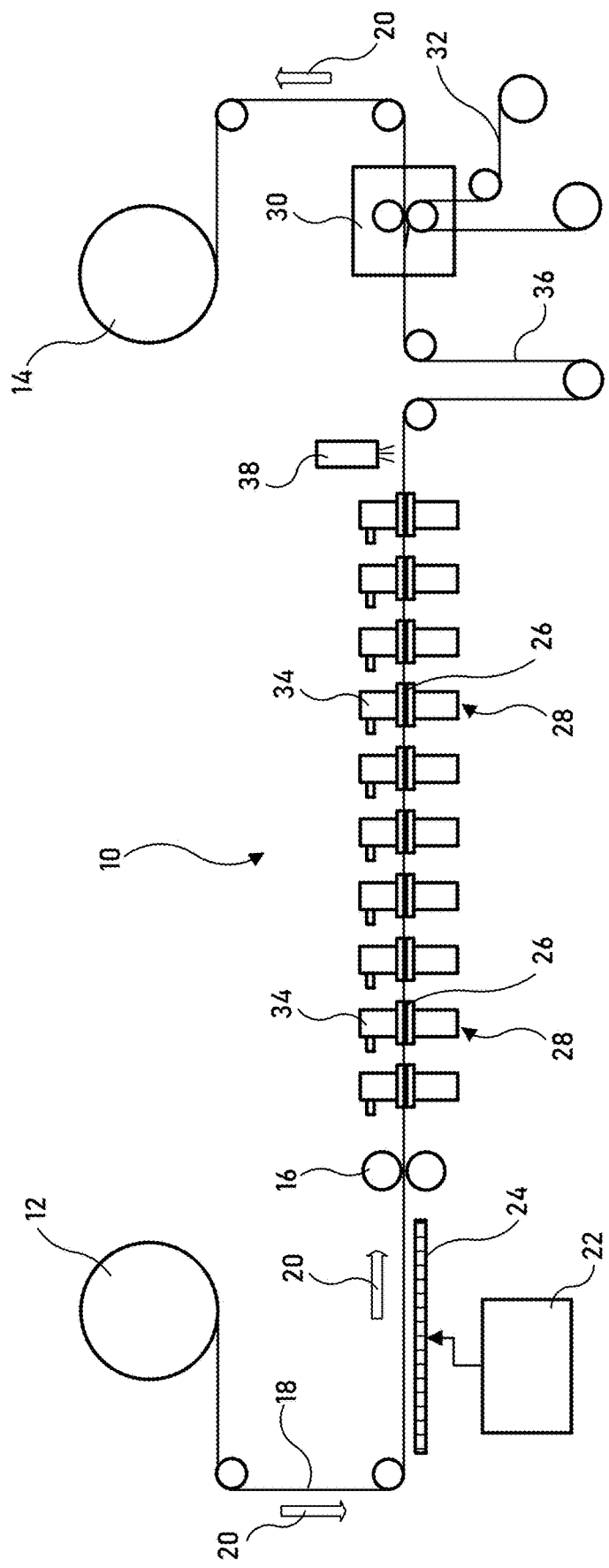

APPARATUS AND METHOD FOR TESTING BLUETOOTH LOW ENERGY (BLE) INLAYS EMPLOYING WAVEGUIDES

FIELD OF THE INVENTION

This disclosure relates generally to a system and method for testing Bluetooth Low Energy (BLE) inlays, and for culling inlays that are not functioning normally.

BACKGROUND OF THE INVENTION

The adoption of Radio Frequency Identification (RFID) for tracking items has grown exponentially over the past few decades. Today, billions of products ranging from closely controlled pharmaceuticals to garments and tires are being tracked each year using small programmable inlays. Each inlay contains an etched antenna, which harvests energy from radio waves, and a silicon chip. Most RFID tracking of consumer goods is accomplished with passive RFID. The inlays have no internal power supply and rely on backscatter to "reflect" a modulated signal back to a specific reader (radio transceiver). Communication with passive RFID is accomplished through discrete read commands from the reader, which causes the inlay to respond with its pre-programmed message. "Active" RFID utilizes inlays that have their own internal power source. These inlays can perform real time functions, such as sensing temperature and other environmental conditions, but they cost significantly more than passive RFID inlays.

Bluetooth Low Energy (BLE) inlays represent the next generation in asset tracking. There are similarities between RFID and BLE inlays, but there are also important differences. BLE inlays have a programmable chip attached to an antenna, but they also have an internal capacitor. RFID operates in the 928 mHz+/− band, while BLE broadcasts at 2.4 gHz. BLE inlays harvest the ubiquitous Bluetooth Rf energy, and using this energy, can perform much like active RFID inlays, but at a cost very close to that of passive RFID inlays. BLE inlays can sense temperature and humidity, and when connected to Wifi with GPS capability, their real time location can be tracked. This can be important in developing and reducing the carbon footprint of consumer products. Retailers can be assured that their perishable products have been stored in safe environmental conditions.

The goal of organizations using either RFID or BLE is 100% reliable communication between the reader and the inlay. Inlay manufacturers cannot guarantee that 100% of their inlays are functional. Inlays may be non-responsive due to chip damage, or their performance can be intermittent due to poor bonding between the chip and the antenna. It is the job of the converter who incorporates the inlay into a label or tag to verify the performance of the finished RFID/BLE product. All RFID inlays are programmed with unique identifying numbers (UID's). Testing of individual inlays is relatively straightforward, because the rapid response time of a UHF chip facilitates singulation at production speeds. The position of non-responsive RFID inlays can easily be known, and they can be removed from the reel of inlays.

By contrast, BLE inlays operate in an environment where they may be energized by any Bluetooth device in their vicinity. For this reason, the packets of information will often be encrypted. Decryption requires a key, and that occurs after the packet is acquired by a Bluetooth device and sent via a Wifi server for downstream analysis. Ascertaining the unique identity of each BLE inlay while performing real time testing is, therefore, challenging. Hence there is a need for a testing apparatus and methodology that is specifically designed to test BLE inlays.

SUMMARY OF THE INVENTION

The present invention is meant to provide just such a solution, by provision of a system for testing inlays employing a Bluetooth Low Energy (BLE) protocol that are carried on a web, and for removing from the web inlays that are not functioning within defined parameters. The system includes an energizing device that energizes the inlays, a plurality of singulation readers disposed downstream of the energizing device that simultaneously interrogate a plurality of pre-energized inlays during a read operation, each singulation reader interrogating a single inlay during the read operation and determining whether or not each interrogated inlay is functioning within the defined parameters, and an automatic reject apparatus disposed downstream of the plurality of singulation readers that removes from the web any inlay determined during the read operation not to be functioning within the defined parameters, based at least in part on a position of the singulation reader interrogating the inlay determined not to be functioning within the defined parameters with respect to a reject gate of the automatic reject apparatus.

In some embodiments, each singulation reader comprises a Bluetooth reader that is shielded for isolation from Bluetooth readers of other singulation readers by a waveguide. In certain of these embodiments, each singulation reader further comprises an antenna.

In some embodiments, the energizing device operates at approximately 2.4 Ghz. In some embodiments, the energizing device operates at approximately 900 Mhz.

In some embodiments, the system further includes an encoder that tracks respective positions of inlays carried on the web as the inlays travel through said system.

In some embodiments, movement of the web is paused during the read operation. In certain of these embodiments, movement of the web is paused for approximately one second during the read operation, and the plurality of singulation readers comprises ten singulation readers. In certain embodiments, an accumulator is disposed between the plurality of singulation readers and the automatic reject apparatus so that movement of the web remains continuous through the automatic reject apparatus even while the web is paused during the read operation.

In some embodiments, the web comprises a release liner to which the inlays are adhered. In some embodiments, an unwind apparatus is positioned upstream of the energizing device, and a rewind apparatus is positioned downstream of the automatic reject apparatus.

In some embodiments, the web comprises a vacuum belt on which the inlays are carried.

In accordance with another aspect of the present invention, a system for testing inlays employing a Bluetooth Low Energy (BLE) protocol that are carried on a web of release liner material to which the inlays are adhered, and for removing from the web inlays that are not functioning within defined parameters, is provided. The system includes an energizing device that energizes the inlays, and a plurality of singulation readers disposed downstream of the energizing device that simultaneously interrogate a plurality of pre-energized inlays during a read operation. Each singulation reader comprises a Bluetooth reader that is shielded for isolation from Bluetooth readers of other singulation readers by a waveguide and an antenna, with each singulation reader interrogating a single inlay during the read operation and determining whether or not each interrogated inlay is functioning within the defined parameters. An automatic reject apparatus disposed downstream of the plurality of singulation readers removes from the web any inlay determined during the read operation not to be functioning within the defined parameters, based at least in part on a position of the singulation reader interrogating the inlay determined not to be functioning within the defined parameters with respect to a reject gate of the automatic reject apparatus. Movement of the web is paused during the read operation, and an accumulator is disposed between the plurality of singulation readers and the automatic reject apparatus so that movement of the web remains continuous through the automatic reject apparatus even while the web is paused during the read operation.

In some embodiments, the energizing device operates at approximately 2.4 Ghz. In some embodiments, the energizing device operates at approximately 900 Mhz.

In some embodiments, the system further includes an encoder that tracks respective positions of inlays carried on the web as the inlays travel through said system. In some embodiments, movement of the web is paused for approximately one second during the read operation, and the plurality of singulation readers comprises ten singulation readers.

In some embodiments, an unwind apparatus is positioned upstream of the energizing device, and a rewind apparatus is positioned downstream of the automatic reject apparatus.

Other features and advantages of the invention will become more apparent from consideration of the following drawings and written description.

BRIEF DESCRIPTION OF THE DRAWING

The sole FIGURE is a schematic representation depicting a system for testing inlays employing a Bluetooth Low Energy (BLE) protocol that are carried on a web, and for removing from the web inlays that are not functioning within defined parameters in accordance with an exemplary embodiment of the present invention.

DETAILED DESCRIPTION OF THE INVENTION

The present invention may be further understood with reference to the following description and the appended drawing, wherein like elements are referred to with the same reference numerals.

Referring to the appended FIGURE, a system (10) constructed in accordance with an exemplary embodiment of the present invention includes an unwind apparatus (12), a rewind apparatus (14), and an encoder (16) to track the position of inlays disposed on a web (18) as they move through the system (indicated by arrows 20). As these components and such an arrangement are extremely well known in the art, these aspects of the system (10) are not discussed in detail herein.

A Bluetooth (2.4 Ghz) and/or a UHF (900 Mhz) device (22), including an antenna (24), is provided to energize a group of inlays entering the system, and an array of antennae (26) connected to separate Bluetooth readers (28) and shielded for isolation from one another (hereinafter referred to as "singulation readers") are disposed along the web (18), as discussed in more detail below. An automatic reject apparatus (30) removes malfunctioning relays from the web (18), and separates them, for example, by redirecting them onto a reject web (32).

Inlays are pre-energized by the energizing device (22) to reduce the response time in the downstream singulation readers (28). When reference is made to "downstream" or "upstream" herein, it should be understood that such reference is made with respect to movement of the web (18) in the direction shown by arrows (20). The singulation readers (28) capture the response from live inlays at precise locations relative to a reject gate associated with the reject apparatus (30). Inlays which fail to properly respond (i.e., which are not functioning within defined parameters) also have a known position and will automatically be rejected downstream.

A unique aspect of the present invention is that waveguides (34) are used to isolate individual inlays in the singulation reader section. A waveguide (34), which may be circular or rectangular in cross section, is a tunnel with dimensions that are particular to a specific frequency range, and in the TE10 mode, propagates a Rf wave very efficiently without outside electrical interference. In this case, the waveguides (34) effectively isolate individual inlays and eliminate "cross-talk" between adjacent inlays, which is an important aspect of the present invention. In addition, the pure "e" field within the waveguides (34) may reduce the response time of BLE inlays. Finally, since BLE inlays must perform in the Rf "e" field, their ability to respond at a preset power threshold in the waveguides (34) is predictive of its performance at a given distance in real world applications. This is highly advantageous when compared to the current state-of-the-art which couples and tests Bluetooth inlays in the magnetic or "near field."

Nevertheless, near field couplers may also be used in the system (10) to singulate inlays to reduce cost. Any array of antennae/readers (26, 28) employing waveguides (34) used to singulate inlays in the method described herein are integral to the present invention.

UHF RFID inlays require about 20 milliseconds from the time of an energizing read command to the time of response. The same cycle for a BLE inlay may take a second or more. Using the methodology proposed herein can reduce cycles for BLE testing to close to that of UHF RFID inlays. BLE chips must calibrate and perform other functions before "advertising" a data packet.

In testing mode, the system cycles intermittently between stationary read mode and transport mode. In the exemplary system illustrated in the FIGURE, the cycle and transport modes are 1 second each and there is an array of 10 singulation antennae (26) attached to Bluetooth readers (28). It should be recognized, however, that the number of singulation antenna may vary, so long as a plurality are provided. Inlays are energized as they enter the system. During energizing, the capacitors of the inlays are pre-charged, such that the inlays are ready to calibrate and transmit their relevant data as soon as they reach the singulation reader section. Given a latency of 700 milliseconds to initially power up and calibrate and the variable time to broadcast packets, all inlays will be pre-energized for up to 3 seconds before reaching the singulation reader section.

In this example, groups of 10 inlays are indexed into the singulation section and remain stationary for 1 second. Each singulation antenna/reader "listens" for a series of information packets which contain a unique identifier. No response within the time allotted or a response that does not meet preset parameters will cause that inlay to be electronically marked as defective (i.e., not functioning within defined parameters). Since the distance of each singulation antenna from the reject gate is known in encoder counts, defective inlays may be automatically removed when that inlay reaches the reject position.

It should be noted that the transport and read time parameters may be adjusted for maximum testing performance. Because inlays are rejected most easily from a continuously moving web, an accumulator (36) may be provided between the singulation antennae (26) and the reject apparatus (30) to translate the intermittent motion of the web (18) into a continuous motion between the singulation antennae and the reject gate.

If desired, an ink jet print head (38) or the like may be provided to visually mark defective inlays so that they are not accidentally used and so that it can be confirmed that all defective inlays are removed by the reject apparatus (30). Also if desired, an optical reader (such as a bar code reader) may be provided to match the inlay with the BLE reading.

An alternative mode of operation to accommodate individually cut inlays is also possible. In this mode, individual inlays are fed onto a moving vacuum belt and transport through the system is provided up to the reject section. The operation in this mode is identical to the web-fed version, and the belt creates a virtual "web."

Although the invention has been described with reference to a particular arrangement of parts, processes, features and the like, these are not intended to exhaust all possible arrangements or features, and indeed many other modifications and variations will be ascertainable to those of skill in the art.

What is claimed is:

1. A system for testing inlays employing a Bluetooth Low Energy (BLE) protocol that are carried on a web, and for removing from the web inlays that are not functioning within defined parameters, said system comprising:
    an energizing device that energizes the inlays;
    a plurality of singulation readers disposed downstream of the energizing device that simultaneously interrogate a plurality of pre-energized inlays during a read operation, each singulation reader interrogating a single inlay during the read operation and determining whether or not each interrogated inlay is functioning within the defined parameters; and
    an automatic reject apparatus disposed downstream of the plurality of singulation readers that removes from the web any inlay determined during the read operation not to be functioning within the defined parameters, based at least in part on a position of the singulation reader interrogating the inlay determined not to be functioning within the defined parameters with respect to a reject gate of the automatic reject apparatus.

2. The system of claim 1 wherein each singulation reader comprises a Bluetooth reader that is shielded for isolation from Bluetooth readers of other singulation readers by a waveguide.

3. The system of claim 2 wherein each singulation reader further comprises an antenna.

4. The system of claim 1 wherein the energizing device operates at approximately 2.4 Ghz.

5. The system of claim 1 wherein the energizing device operates at approximately 900 Mhz.

6. The system of claim 1 further comprising an encoder that tracks respective positions of inlays carried on the web as the inlays travel through said system.

7. The system of claim 1 wherein movement of the web is paused during the read operation.

8. The system of claim 7, wherein movement of the web is paused for approximately one second during the read operation, and wherein the plurality of singulation readers comprises ten singulation readers.

9. The system of claim 7 further comprising an accumulator disposed between the plurality of singulation readers and the automatic reject apparatus so that movement of the web remains continuous through the automatic reject apparatus even while the web is paused during the read operation.

10. The system of claim 1 wherein the web comprises a release liner to which the inlays are adhered.

11. The system of claim 10 further comprising:
    an unwind apparatus positioned upstream of the energizing device; and
    a rewind apparatus positioned downstream of the automatic reject apparatus.

12. The system of claim 1 wherein the web comprises a vacuum belt on which the inlays are carried.

13. A system for testing inlays employing a Bluetooth Low Energy (BLE) protocol that are carried on a web of release liner material to which the inlays are adhered, and for removing from the web inlays that are not functioning within defined parameters, said system comprising:
    an energizing device that energizes the inlays;
    a plurality of singulation readers disposed downstream of the energizing device that simultaneously interrogate a plurality of pre-energized inlays during a read operation, each singulation reader comprising a Bluetooth reader that is shielded for isolation from Bluetooth readers of other singulation readers by a waveguide and an antenna, with each singulation reader interrogating a single inlay during the read operation and determining whether or not each interrogated inlay is functioning within the defined parameters;
    an automatic reject apparatus disposed downstream of the plurality of singulation readers that removes from the web any inlay determined during the read operation not to be functioning within the defined parameters, based at least in part on a position of the singulation reader interrogating the inlay determined not to be functioning within the defined parameters with respect to a reject gate of the automatic reject apparatus;
    wherein movement of the web is paused during the read operation; and
    an accumulator disposed between the plurality of singulation readers and the automatic reject apparatus so that movement of the web remains continuous through the automatic reject apparatus even while the web is paused during the read operation.

14. The system of claim 13 wherein the energizing device operates at approximately 2.4 Ghz.

15. The system of claim 13 wherein the energizing device operates at approximately 900 Mhz.

16. The system of claim 13 further comprising an encoder that tracks respective positions of inlays carried on the web as the inlays travel through said system.

17. The system of claim 13, wherein movement of the web is paused for approximately one second during the read operation, and wherein the plurality of singulation readers comprises ten singulation readers.

18. The system of claim 13 further comprising:
    an unwind apparatus positioned upstream of the energizing device; and
    a rewind apparatus positioned downstream of the automatic reject apparatus.

* * * * *